(12) United States Patent
Lee (10) Patent No.: US 9,067,504 B1
(45) Date of Patent: Jun. 30, 2015

(54) PERTURBATIVE INJECTION FOR BATTERY PARAMETER IDENTIFICATION

(71) Applicant: FORD GLOBAL TECHNOLOGIES, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/154,745

(22) Filed: Jan. 14, 2014

(51) Int. Cl.
*B60L 9/00* (2006.01)
*B60L 11/18* (2006.01)

(52) U.S. Cl.
CPC .......... *B60L 11/1851* (2013.01); *B60L 11/1866* (2013.01); *Y02T 10/7044* (2013.01); *Y02T 10/7055* (2013.01); *B60L 11/1861* (2013.01)

(58) Field of Classification Search
CPC ............ Y02T 10/7055; Y02T 10/7005; Y02T 10/7044; B60L 11/1866; B60L 2240/549; B60L 11/185; B60L 11/1853; B60L 11/1861; H01M 10/441
USPC .......... 701/22; 180/65.21; 320/118, 119, 121; 324/430
See application file for complete search history.

(56) References Cited

U.S. PATENT DOCUMENTS 7,427,107 B2 * 9/2008 Yang ................ 297/354.11
8,058,844 B2 * 11/2011 Altemose ................ 320/118

FOREIGN PATENT DOCUMENTS

ES 2178954 A1 1/2003
JP 961505 A 3/1997
JP 1132442 A 2/1999

OTHER PUBLICATIONS

Y. Barsukov et al., Better Battery Management Through Digital Control, Power Electronics Technology (2006) pp. 30-35, Texas Instruments, Dallas, Texas, US.
E. Barsoukov et al., Universal Battery Parameterization to Yield a Non-Linear Equivalent Circuit Valid for Battery Simulation at Arbitrary Load (1999) Journal of Power Sources, vol. 83, Issues 1-2, pp. 61-70, Kumho Chemical Laboratories, Taejeon, South Korea.

* cited by examiner

*Primary Examiner* — Gertrude Arthur Jeanglaud
(74) *Attorney, Agent, or Firm* — David B. Kelly; Brooks Kushman P.C.

(57) ABSTRACT

A battery system includes a traction battery and at least one controller that implement a model of the traction battery. The system may monitor current input and voltage output of the traction battery. The at least one controller may inject a plurality of current signals into the battery when it detects the input current to be approximately zero and a corresponding terminal voltage to be generally constant. Each of the injected current signals has a discrete frequency. The controller may measure voltage responses to the injected currents indicative of impedances of the traction battery at the discrete frequencies. The controller may output parameters representing an equivalent circuit model of the traction battery based on the impedances, and operate the battery based on the parameters.

15 Claims, 5 Drawing Sheets

PERTURBATIVE INJECTION FOR BATTERY PARAMETER IDENTIFICATION

TECHNICAL FIELD

The present disclosure relates to techniques for estimating parameters of elements forming a battery model and providing control to an associated battery.

BACKGROUND

Hybrid electric vehicles (HEV) utilize a combination of an internal combustion engine with an electric motor to provide the power needed to propel a vehicle. This arrangement provides improved fuel economy over a vehicle that has only an internal combustion engine. One method of improving the fuel economy in an HEV includes shutting down the engine during times that the engine operates inefficiently, and is not otherwise needed to propel the vehicle. In these situations, the electric motor coupled with a battery system is used to provide all of the power needed to propel the vehicle. When the driver power demand increases such that the electric motor can no longer provide enough power to meet the demand, or in other cases such as when the battery state of charge (SOC) drops below a certain level, the engine should start quickly and smoothly in a manner that is nearly transparent to the driver.

SUMMARY

A battery system includes a traction battery and at least one controller that injects into the battery a plurality of currents each having a discrete frequency while an input current to the battery is approximately zero and a terminal voltage of the battery is generally constant. The at least one controller further measures voltage responses to the injected currents indicative of impedances of the battery at the discrete frequencies, outputs parameters representing an equivalent circuit model of the battery based on the impedances, and controls the battery based on the parameters.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An HEV battery system may implement a battery management strategy that estimates values descriptive of the present operating condition of the battery pack and/or one or more battery cells. The battery pack and/or one or more cell operating conditions include battery state of charge, power fade, capacity fade, and instantaneous available power. The battery management strategy may be capable of estimating values as cells age over the lifetime of the pack. The precise estimation of some parameters may improve performance and robustness, and may ultimately lengthen the useful lifetime of the battery pack. For the battery system described herein, estimation of some battery pack and/or cell parameters can be realized as discussed below.

Figure 1:
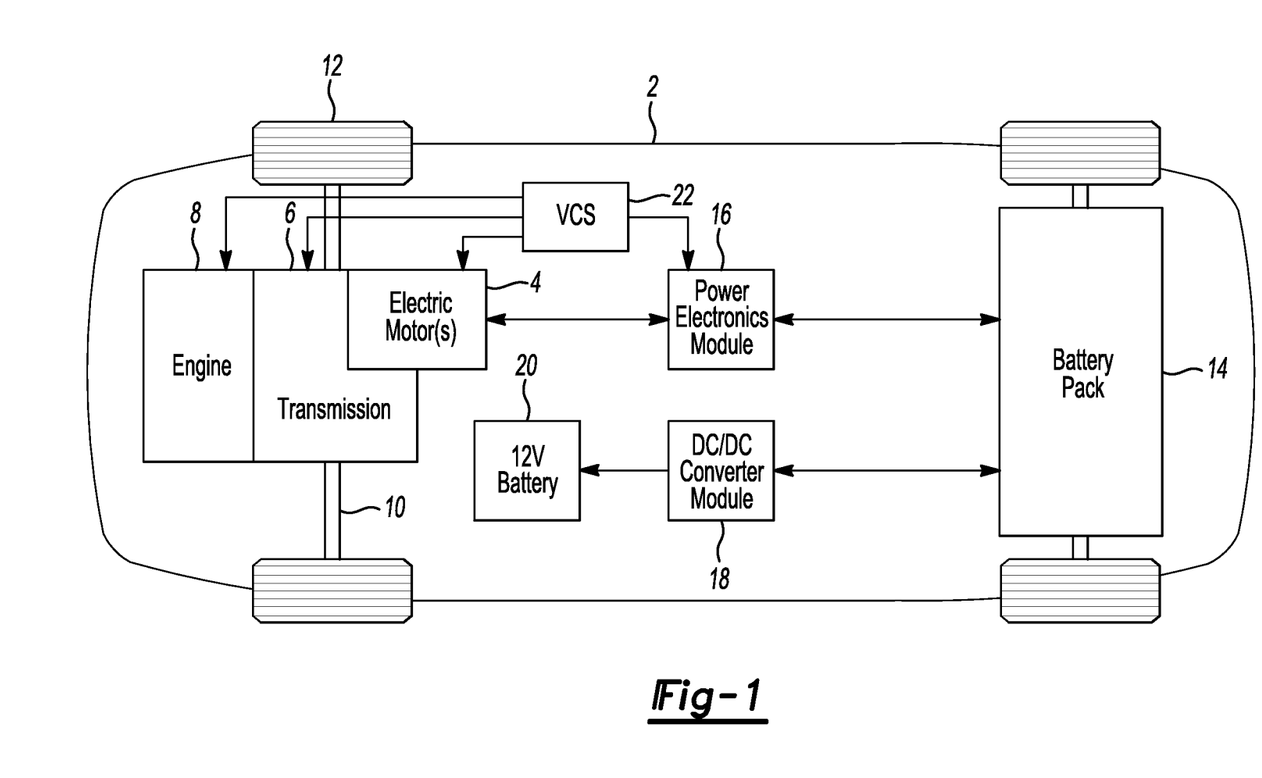
FIG. 1 is a schematic diagram of a hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 is also mechanically connected to a drive shaft 10 that is mechanically connected to the wheels 12. In another embodiment not depicted in the illustration, the hybrid transmission may be a non-selectable gear transmission that may include at least one electric machine. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

A battery pack 14 may include, but is not limited to, a traction battery having one or more battery cells that store energy which can be used by the electric motors 4. The vehicle battery pack 14 typically provides a high voltage DC output and is electrically connected to a power electronics module 16. The power electronics module 16 may communicate with one or more control modules that make up a vehicle computing system 22. The vehicle computing system 22 may control several vehicle features, systems, and/or subsystems. The one or more modules may include, but are not limited to, a battery management system. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

The battery pack 14 may be controlled by the power electronic module 16 which may receive commands from a vehicle computing system 22 having one or more control modules. The one or more control modules may include, but are not limited to, a battery control module. The one or more control modules may be calibrated to control the battery pack 14 using a battery model parameter estimation method which estimates an average sense of effective battery internal resistance during operation to determine battery power capability. The power capability prediction enables the battery pack 14 to prevent over-charging and over-discharging which could lead to reducing the life of the battery, performance issues with the vehicle powertrain, etc.

The battery parameter prediction method and/or strategy may assist in determining representative battery current limits and power capability. Many battery parameter estimation processes are affected by the fidelity of battery models and unpredicted environmental conditions or unexpected noises during battery operation. For example, if a battery is in a charge depleting mode, a simple battery model may not capture complicated system dynamics associated with voltage output and current input they are trying to measure. A system may use a simple equivalent circuit model to implement a selective injection signal processing technique in the frequency domain to identify model parameters for battery dynamics predictions. The vehicle battery measurement method/strategy may use the equivalent circuit model using one or more resistant-capacitor (R-C) circuits in several configurations to measure the battery pack in the vehicle to obtain the electrochemical impedance during operation.

Figure 2A:
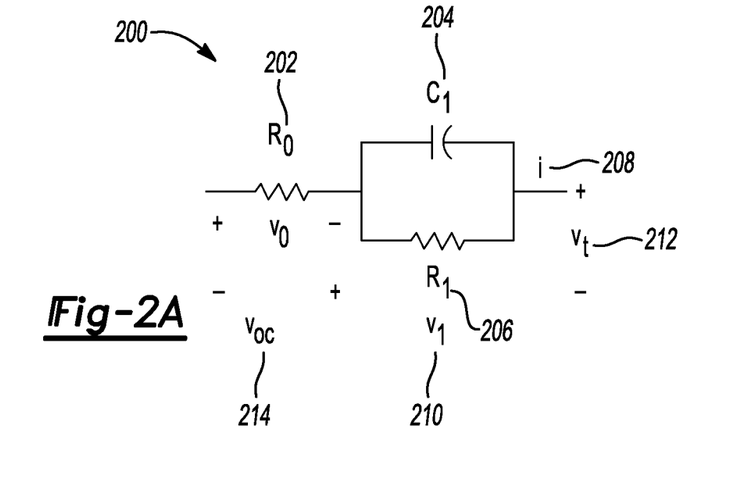
FIG. 2A is a schematic diagram of an equivalent circuit for a Li-ion battery.

FIG. 2A is a schematic of a simple equivalent circuit to model a Li-ion battery. The simple equivalent circuit model 200 includes, but is not limited to, a Randles Circuit Model, and/or at least one R-C circuit. The Randles circuit (and/or R-C circuit) consists of an active electrolyte resistance $R_0$ 202, in series with the parallel capacitance $C_1$ 204 and an active charge transfer resistance $R_1$ 206. The Randles circuit may be implemented in a HEV battery management system to provide predictive computations for battery parameters.

The HEV battery management system may implement the Randles Circuit Model using the injection signal processing technique to estimate the battery parameters. The estimated battery parameters may include fluctuating trajectories which may increase when the vehicle is in a certain system mode including charging mode, sustaining mode, or depleting mode. These battery parameters tend to be sensitive to internal and external noises and environment conditions when using a Randles circuit to estimate these parameters.

A battery management system and method may be based on a Randles Circuit Model to provide improved model parameter identification of the battery system and subsequent robustness in battery dynamics prediction without increasing the system complexity. The equivalent circuit model 200 may allow the calculation of predictive battery system parameters. The Randles Circuit Model is represented by the following equation:

$$\dot{v}_1 = -\frac{1}{R_1 C_1} v_1 + \frac{1}{C_1} i \quad (1a)$$

where $v_1$ 210 is the voltage across the R-C circuit, which consists of $R_1$ 206 and $C_1$ 204 as a function of time and other variables, i 208 is the current exiting the circuit, and $R_1$ 206 and $C_1$ 204 characterize battery dynamics changing during vehicle operation. The equivalent circuit model may allow the calculation of the battery terminal voltage using the following equation:

$$y = v_{OC} - v_t = v_1 + R_0 i \quad (1b)$$

where $v_t$ 212 is the terminal voltage, $v_{OC}$ 214 is the open circuit voltage, and $R_0$ 202 is the internal battery resistance. The battery system dynamics identified by the equivalent circuit model may be used to calculate/predict/estimate battery parameters which may be determined from the electrochemical properties of the battery.

The Laplace transform is applied to equations (1a) and (1b) to allow the system to calculate impedance of the equivalent circuit in a frequency domain by using the following equations:

$$sV_1(s) = -\frac{1}{R_1 C_1} V_1(s) + \frac{1}{C_1} I(s) \quad (2a)$$

$$Y(s) = V_1(s) + R_0 I(s) \quad (2b)$$

where $sV_1(s)$ is a differentiation of the voltage, $V_1(s)$ is a measured voltage at the discrete frequency, $I(s)$ is a measured current input at the discrete frequency, and $Y(s)$ is a measured voltage response. The Laplace transform allows for the system to measure the input/output relationship of the equivalent circuit for determining impedance based on the input current frequency. The Laplace transform provides a function description that often simplifies the process of analyzing the behavior of the battery management system based on the injected current at a discrete frequency when the input current is approximately zero and the output voltage is generally constant.

The impedance is calculated based on the measured voltage response and current input by using the following equation:

$$Z(s) = \frac{Y(s)}{I(s)} = R_0 + \frac{R_1}{R_1 C_1 s + 1} \quad (3)$$

where $Z(s)$ is the measured impedance of the Randles circuit model 200 at the discrete frequency computed from the injected current $I(s)$ and the voltage response $Y(s)$. The measured impedance in equation (3) is expressed by parameters, $R_0$, $R_1$, and $C_1$, in the equivalent circuit model.

The impedance is a function of the frequency of the excitation input injected into the battery pack. The internal impedance may be expressed as a function of the frequency of the input current. The frequency response of the impedance at the frequency expressed by an angular velocity $\omega$ is calculated by using the following equations:

$$Z(j\omega) = \frac{Y(j\omega)}{I(j\omega)} = R_0 + \frac{R_1}{jR_1 C_1 \omega + 1} \quad (4a)$$

where $Z(j\omega)$ is the impedance of the battery at the frequency of $\omega$, $I(j\omega)$ is the input current to the battery at the frequency of $\omega$, j is the imaginary unit defined by $j^2 = -1$, and $Y(j\omega)$ is the voltage response of the battery at the frequency of $\omega$.

Equation (4a) may be rearranged as the following equation:

$$R_0 + \frac{R_1}{jR_1 C_1 \omega + 1} = \left(R_0 + \frac{R_1}{1 + R_1^2 C_1^2 \omega^2}\right) - j\left(\frac{R_1^2 C_1 \omega}{1 + R_1^2 C_1^2 \omega^2}\right) \quad (4b)$$

Figure 2B:
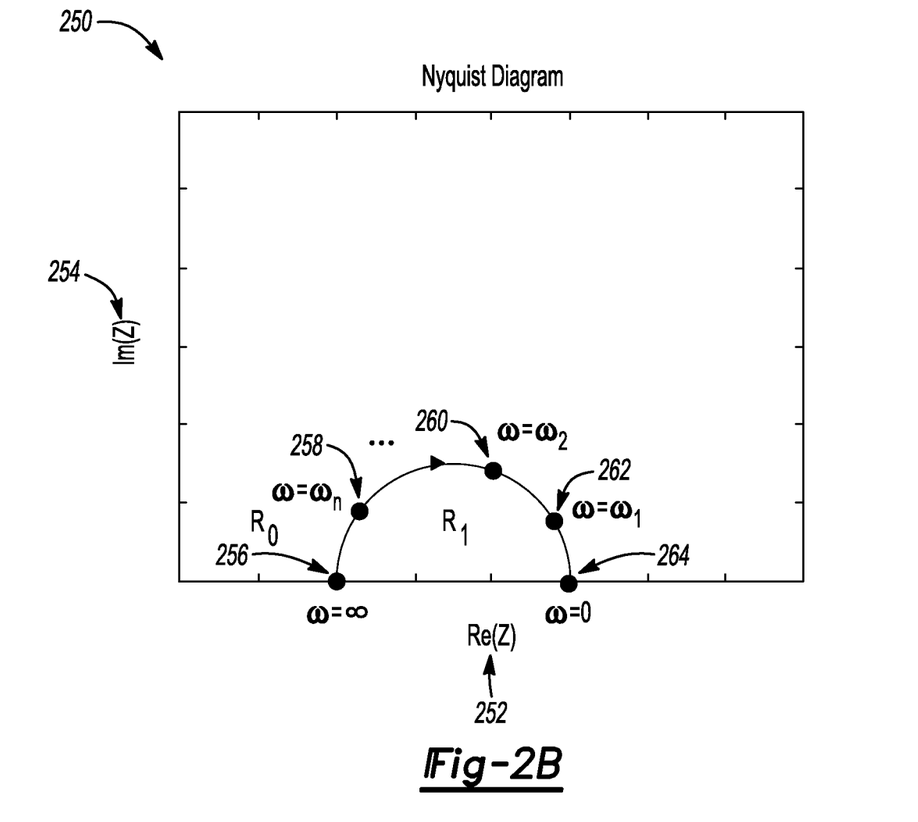
FIG. 2B is a Nyquist diagram representing the frequency response of calculated impedance.

FIG. 2B is a Nyquist diagram representing frequency responses of the calculated impedance at difference frequencies $\omega_1, \omega_2, \ldots, \omega_n$. The Nyquist diagram 250 is represented by a real part of the transfer function plotted on the x-axis 252 and an imaginary part plotted on the y-axis 254. The real part of the transfer function is calculated by the following equation:

$$\text{Re}(Z) = R_0 + \frac{R_1}{1 + R_1^2 C_1^2 \omega^2} \tag{5a}$$

The imaginary part of the transfer function is calculated by the following equation:

$$\text{Im}(|Z|) = \frac{R_1^2 C_1 \omega}{1 + R_1^2 C_1^2 \omega^2} \tag{5b}$$

where $\omega$ is the frequency of an input current. If $\omega \gg 1$, then $\text{Re}(Z) = R_0$. Thus, $R_0$ may be identified by injecting an input current(s) at high frequency satisfying $\omega \gg 1$.

The parameters $R_1$ and $C_1$ may be identified by assigning different frequency input currents (e.g., $\omega=\omega_1$, $\omega=\omega_2$, ..., $\omega=\omega_k, \ldots, \omega=\omega_n$) to the battery. The computed impedance at discrete frequencies may be located on the half circle in the Nyquist diagram 250 represented as one of the points 256, 258, 260, 262, 264.

The battery parameters may be estimated with the use of an equivalent circuit model. The impedance of the battery at frequency $\omega$ may be calculated using the following equations (6), (7), (8), (9a), and (9b). The battery input signal can be prepared at discrete frequencies based on the following equation:

$$I = I_0 e^{j \omega t} \tag{6}$$

where $I_0$ is the magnitude of the injected current, and w is an angular velocity corresponding to the frequency. The battery voltage outputs with respect to the current input at frequency $\omega$ may be calculated based on the following equation:

$$V = V_0 e^{j(\omega t + \phi)} \tag{7}$$

where $V_0$ is the output voltage of the equivalent circuit model and $\phi$ is the phase shift angle of the voltage response with respect to the current input. The impedance of the battery at the angular frequency $\omega$ is calculated based on the following equation:

$$Z(j\omega) = \frac{V(j\omega)}{I(j\omega)} \tag{8}$$

where $Z(j\omega)$ is an impedance at frequency $\omega$. The impedance point in equation (8) is based on the input current and output voltage at an angular frequency.

The battery model parameters may be identified using generalized linear regression analysis. The generalized linear regression analysis uses a set of data comprising of explanatory variables (or independent variables) and response variables (or dependent variables) to identify the regression equation for the best fit of data.

The explanatory variables and response variables are defined from a real part and an imaginary part of the computed impedance at a given angular frequency co as follows:

$$y_{1,k} = \text{Re}(Z(j\omega_k)) - R_0 = \frac{R_1}{1 + R_1^2 C_1^2 \omega_k^2} = R_1 x_{1,k} \tag{9a}$$

$$y_{2,k} = \text{Im}(|Z|) = \frac{R_1^2 C_1 \omega_k}{1 + R_1^2 C_1^2 \omega_k^2} = R_1 C_1 \omega_k y_{1,k} = a x_{2,k} \tag{9b}$$

where $$x_{1,k} = \frac{1}{1 + a^2 \omega_k^2} \tag{10a}$$

$$x_{2,k} = \omega_k y_{1,k} \tag{10b}$$

$$a = R_1 C_1 \tag{11}$$

Data of the explanatory variables can be rearranged as $$x_1 = [x_{1,1} \quad x_{1,2} \quad \cdots \quad x_{1,n}]^T \tag{12a}$$

$$x_2 = [x_{2,1} \quad x_{2,2} \quad \cdots \quad x_{2,n}]^T \tag{12b}$$

where n is the number of data equivalent to the number of discrete frequencies of the injected currents.

Data of the response variables can be rearranged as $$y_1 = [y_{1,1} \quad y_{1,2} \quad \cdots \quad y_{1,n}]^T \tag{13a}$$

$$y_2 = [y_{2,1} \quad y_{2,2} \quad \cdots \quad y_{2,n}]^T \tag{13b}$$

The battery model parameters are then computed based on the following equations:

$$R_1 = (x_1^T x_1)^{-1} x_1 y_1 \tag{14a}$$

$$a = R_1 C_1 = (x_2^T x_2)^{-1} x_2^T y_2 \tag{14b}$$

where equation (14a) and equation (14b) are the standard formulation to find regression coefficients in generalized linear regression analysis. Therefore based on equation (14b), the following equation is formed:

$$C_1 = a / R_1 \tag{15}$$

The battery model parameters, $R_0$, $R_1$, and $C_1$, are identified following the described procedure.

Figure 3:
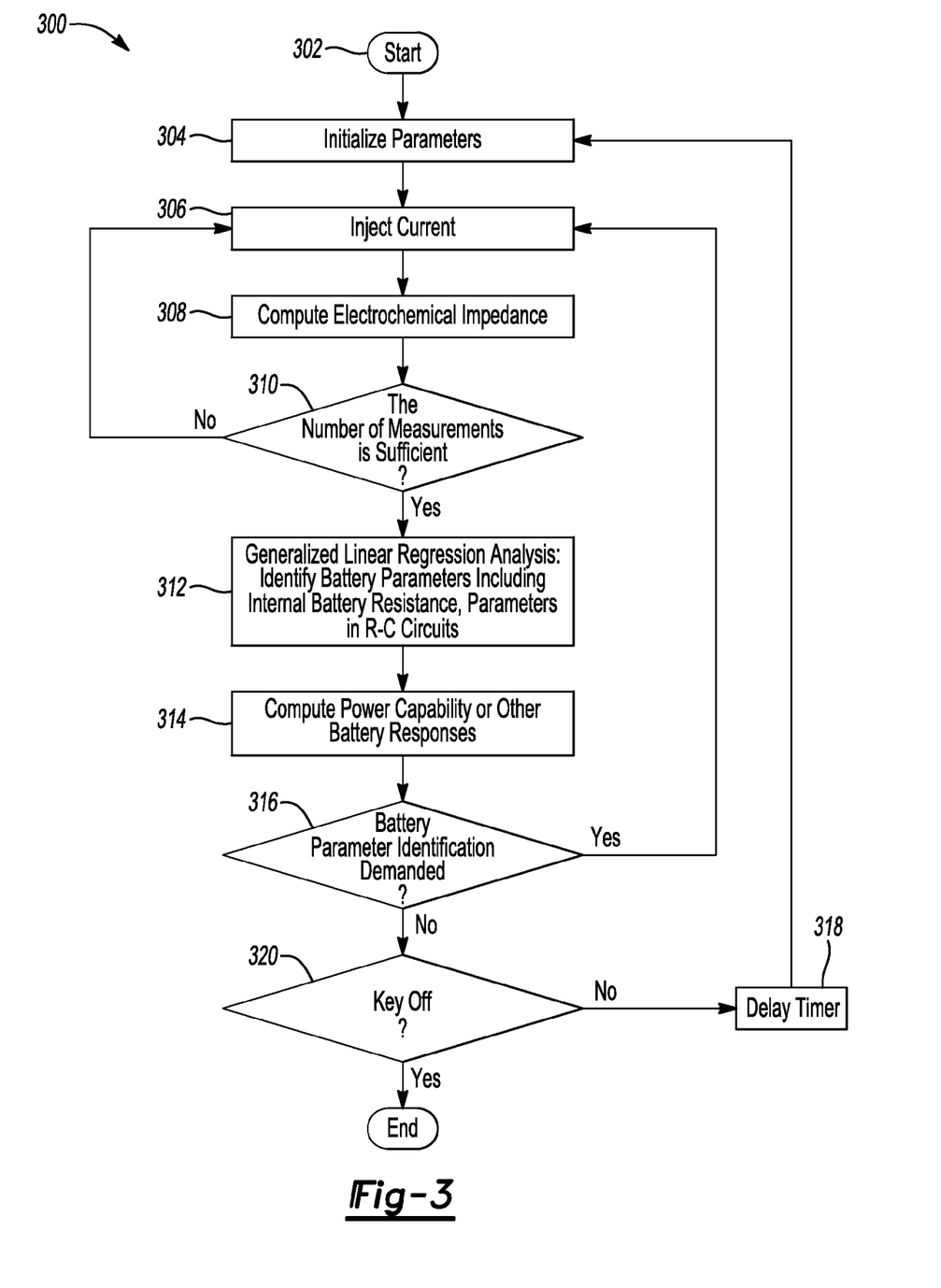
FIG. 3 is a flow chart of an algorithm for identifying one or more battery model parameters.

FIG. 3 is a flow chart of an algorithm for identifying one or more battery model parameters used in a battery management method. The method may be implemented using software code contained within the vehicle control module. In other embodiments, the method 300 may be implemented in other vehicle controllers, or distributed amongst multiple vehicle controllers.

Referring again to FIG. 3, the vehicle and its components illustrated in FIG. 1, FIG. 2A, and FIG. 2B are referenced throughout the discussion of the method to facilitate understanding of various aspects of the present disclosure. The method of controlling the battery parameter prediction in the hybrid electric vehicle may be implemented through a computer algorithm, machine executable code, or software instructions programmed into a suitable programmable logic device(s) of the vehicle, such as the vehicle control module, the hybrid control module, other controller in communication with the vehicle computing system, or a combination thereof. Although the various steps shown in the flowchart diagram 300 appear to occur in a chronological sequence, at least some of the steps may occur in a different order, and some steps may be performed concurrently or not at all.

At step 302 during a key-on event which allows the vehicle to be powered on, the vehicle computing system may begin powering up the one or more modules. The powering up of the one or more modules may cause variables related to the battery management system to initialize before enabling one or more algorithms to be executed within the vehicle computing system at step 304.

For example, the battery parameters may need to be initialized during a key-on event due to the dynamics of a battery cell at rest having a self-discharge/charge depletion state. The battery management method may initialize the system before transmitting current injections and predicting the battery terminal voltage, current limits, and/or other battery related parameters characterizing battery dynamics while the battery pack experiences a charge sustaining operation or a charge depletion operation. The battery dynamics may vary based on several factors including length of vehicle power down without charge, life of the battery, battery operating modes, and/or environmental conditions.

At step 306, if the system detects that an input current is approximately zero and the output voltage is generally constant, the system may transmit the injection of current into the battery pack. The battery may have an output voltage at a constant value, when an input current is approximately zero in several modes including, but not limited to, idle, park or neutral. The battery may also have an output voltage at a constant value when the internal combustible engine alone is used to produce the demanded propulsion power such that the battery is at a constant state of charge (and is not being charged or discharged).

For example during a key-on event, the input current is approximately zero and the battery output voltage may be at a constant value. Therefore, the system may demand at least three current injections to the battery pack to allow the system to calculate the impedance. The at least three current injections may comprise current signals having discrete angular frequencies.

At step 308, the system may compute the electrochemical impedance based on the Laplace transformed battery output voltage divided by the Laplace transformed injected current input at the discrete frequency.

At step 310, the system may determine if additional injection(s) of current(s) is needed to identify the battery model parameters to characterize the dynamics of the battery pack and/or the one or more cells at discrete frequencies. If the number of impedance measurements is less than the required number to identify the model parameters, additional injection of current is executed during the period when the battery output voltage may be at a constant value and current input is approximately zero. If the number of impedance measurement is sufficient to identify the model parameters, the next step, a generalized linear regression analysis, is followed.

At step 312, the system may identify the battery model parameters using a generalized linear regression analysis. The generalized linear regression analysis uses a set of data comprising explanatory variables (or independent variables) and response variables (or dependent variables) to identify the regression equation for the best fit of data. The data sets are prepared by manipulating the real part and imaginary part of the battery impedance collected at discrete frequencies. The battery parameters may include, but are not limited to, the internal battery resistance and the parameters in the R-C circuit in the equivalent circuit 200. The battery parameters may be different based on the structure of an equivalent circuit model used in the battery management method.

At step 314, the system may predict battery responses which may include, but are not limited to, the battery power capability. The predicted battery responses may allow the system to determine how the battery power and energy are managed during operation. Using an accurate predicting algorithm improves the life of the battery, performance of the powertrain system, and the performance of other systems/subsystem powered by the battery pack in the battery electric and/or hybrid electric vehicle. The battery management system calculating the battery parameters during vehicle operation using the injected current strategy enables the system to improve the prediction of battery responses resulting in effective and safe operation of the battery pack.

At step 316, the system may identify whether the battery parameters need to be updated. The parameter update may be required when the predicted battery responses using the identified parameters are significantly different from the measured battery responses. Specific criteria may be determined based on the vehicle operating modes, such as charge sustaining or charge depleting, and battery dynamic characteristics. For example when the battery response prediction error is calculated to be over a calibrated threshold (e.g., 10%), the battery parameter identification is demanded.

At step 318 if the output voltage is not at a constant value and the input current is not at approximately zero, the system may enable a delay timer to wait for the condition to execute the parameter identification procedure. The condition may include that the input current is at approximately zero and the output voltage is at a constant. The delay timer may be a hard coded or calibratable value that allows the system to re-initialize the parameters before determining whether to demand the plurality of current injections.

At step 320 if the system detects a key-off event which may disable power to the vehicle computing system, the system may end the one or more algorithms used to manage the battery pack and/or the one or more battery cells. The vehicle computing system may have a vehicle key-off mode to allow the system to store one or more parameters in nonvolatile memory such that these parameters may be used by the system for the next key-on event.

Figure 4:
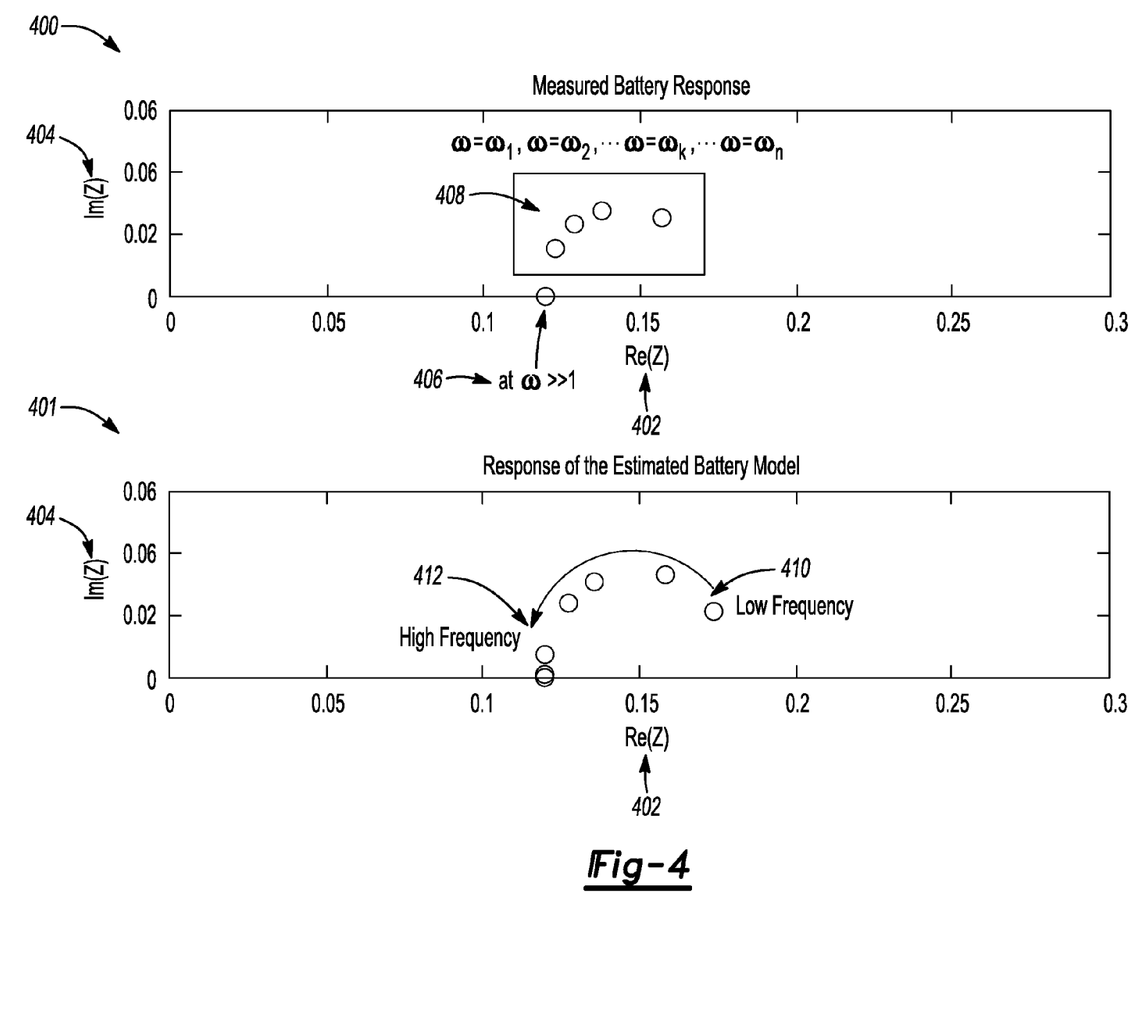
FIG. 4 are graphs representing voltage output and current input to the battery pack.

FIG. 4 are graphs representing voltage output and current input current to the battery pack. The measured battery response diagram 400 is represented by a real part of the transfer function plotted on the x-axis 402 and an imaginary part plotted on the y-axis 404. Based on the frequency 406 being greater than one, a set of battery impedances 408 are measured from the voltage responses and the input currents at difference frequencies $\omega_1, \omega_2, \ldots, \omega_n$. The measured impedances are plotted in the Nyquist plots, and they may be located on a half circle as shown in FIG. 4.

The response of the estimated battery model diagram 401 is represented by a real part of the transfer function plotted on the x-axis 402 and an imaginary part plotted on the y-axis 404. The locations of the impedance may be changed from the right (representing low frequency 410) to the left (representing high frequency 412) as the input current frequency increases.

Battery model parameters may be identified from the set of battery impedances measured from the voltage responses and the input currents at difference frequencies $\omega_1, \omega_2, \ldots, \omega_n$. The generalized linear regression analysis, described in equations (1) through (15), is used to identify the model parameters. Once the model parameters are identified, the battery impedance at any frequency may be computed. The impedance points at different frequencies computed from the identified battery model are plotted in FIG. 4.

Figure 5:
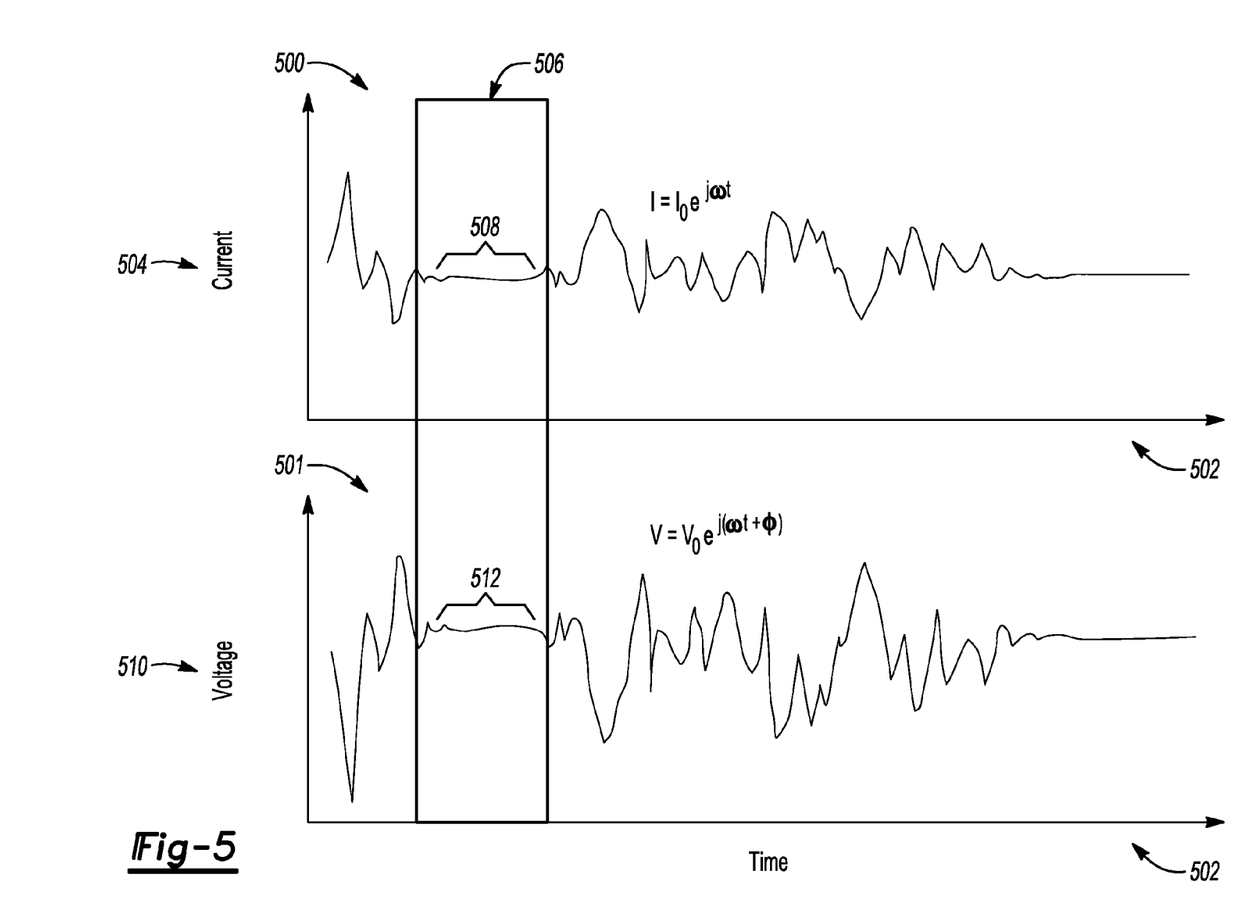
FIG. 5 are graphs displaying measured battery current and voltage profiles.

FIG. 5 are graphs displaying a battery current profile and a voltage profile measured in a vehicle or by a battery test. The current profile graph 500 is represented by having time 502 on the x-axis and current 504 on the y-axis. The voltage profile graph 501 is represented by having time 502 on the x-axis and voltage 510 on the y-axis.

The time window 506 illustrates a proper period to inject perturbation input currents to the battery. The input current 508 from the battery controller is approximately zero during this period 506, and the terminal voltage response 512 is approximately constant during this period 506. During this period 506, the system may control perturbation input currents at different frequencies $\omega_1, \omega_2, \ldots, \omega_n$ to be injected to the battery. The system may measure output voltage responses corresponding to the frequencies. The set of input currents and output voltage responses are stored in the battery controller. When the number of data points is large enough to identify the model parameters, the parameter identification algorithm based on the generalized linear regression analysis is executed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery system comprising:
a traction battery; and
at least one controller programmed to,
while an input current to the battery is approximately zero and a terminal voltage of the battery is generally constant, inject into the battery a plurality of currents each having a discrete frequency,
measure voltage responses to the injected currents indicative of impedances of the battery at the discrete frequencies,
output parameters representing an equivalent circuit model of the battery based on the impedances, and
control the battery based on the parameters.

2. The battery system of claim 1, wherein the frequencies are predetermined.

3. The battery system of claim 2, wherein the frequencies are based on response characteristics of the battery.

4. The battery system of claim 1, wherein the parameters include internal resistance or capacitance.

5. The battery system of claim 1, wherein controlling the battery includes charging and discharging the battery.

6. A vehicle comprising:
a battery pack having one or more cells; and
at least one controller programmed to,
in response to an input current to the cells being approximately zero and a terminal voltage of the cells being generally constant, inject a plurality of currents each having a discrete frequency into the cells,
measure voltage responses to the injected currents indicative of impedances of the cells at the discrete frequencies,
output parameters representing an equivalent circuit model of the cells based on the impedances, and
control the cells based on the parameters.

7. The vehicle of claim 6, wherein the frequencies are predetermined.

8. The vehicle of claim 7, wherein the frequencies are based on response characteristics of the battery.

9. The vehicle of claim 6, wherein the parameters include internal resistance or capacitance.

10. The vehicle of claim 6, wherein controlling the battery includes charging and discharging the battery.

11. A method comprising:
while an input current to a battery is approximately zero and a terminal voltage is generally constant, injecting into the battery a plurality of currents each having a discrete frequency;
measuring voltage responses to the injected currents indicative of impedances of the battery at the discrete frequencies;
outputting parameters representing an equivalent circuit model of the battery based on the impedances; and
controlling the battery based on the parameters.

12. The method of claim 11, wherein the frequencies are predetermined.

13. The method of claim 12, wherein the frequencies are based on response characteristics of the battery.

14. The method of claim 11, wherein the parameters include internal resistance or capacitance.

15. The method of claim 11, wherein controlling the battery includes charging and discharging the battery.

\* \* \* \* \*